(12) United States Patent
Matsuda et al.

(10) Patent No.: US 8,333,437 B2
(45) Date of Patent: Dec. 18, 2012

(54) TIRE-WHEEL ASSEMBLY AND DISASSEMBLY METHOD FOR THE SAME

(75) Inventors: Jun Matsuda, Hiratsuka (JP); Keisuke Chino, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 362 days.

(21) Appl. No.: 12/829,797

(22) Filed: Jul. 2, 2010

(65) Prior Publication Data

US 2011/0003920 A1    Jan. 6, 2011

(30) Foreign Application Priority Data

Jul. 6, 2009   (JP) ................. 2009-160163

(51) Int. Cl.
*B60C 15/036* (2006.01)
*B60C 25/01* (2006.01)

(52) U.S. Cl. ... 301/5.1; 152/246; 152/152.1; 152/381.5; 157/1.1

(58) Field of Classification Search .............. 301/5.1, 301/9.1; 152/152.1, 246, 300, 301, 302, 152/303, 323, 324, 325, 326, 375, 381.5, 152/381.6; 29/894.31; 157/1, 1.1
See application file for complete search history.

(56) References Cited

U.S. PATENT DOCUMENTS

| | | | | |
|---|---|---|---|---|
| 3,504,725 A | * | 4/1970 | Roberts et al. | 152/153 |
| 3,938,573 A | * | 2/1976 | Hallenbeck | 152/504 |
| 4,015,652 A | * | 4/1977 | Harris | 152/379.3 |
| 7,332,218 B1 | * | 2/2008 | Gilbert | 428/343 |
| 7,465,492 B2 | * | 12/2008 | Gilbert | 428/343 |
| 7,963,395 B2 | * | 6/2011 | Sandberg | 206/460 |

FOREIGN PATENT DOCUMENTS

| | | | | |
|---|---|---|---|---|
| JP | 2000319599 A | * | 11/2000 | |
| JP | 2001219706 A | * | 8/2001 | |
| JP | 2002-178723 | | 6/2002 | |
| JP | 2009008615 A | * | 1/2009 | |

* cited by examiner

*Primary Examiner* — Kip T Kotter
(74) *Attorney, Agent, or Firm* — Thorpe North & Western LLP

(57) ABSTRACT

A tire-wheel assembly and disassembly method is disclosed wherein relative shifting of a tire and a wheel when braking and/or cornering can be suppressed without negatively affecting tire replacement workability. Specifically, a tire-wheel assembly has a wheel constructed from an electrically conductive material and a tire assembled on an outer peripheral side of the wheel, wherein an electrically conductive layer is formed on at least a part of a wheel contact surface of the tire, and an electrically debonding adhesive comprising an ionic liquid is interposed between the electrically conductive layer of the tire and the wheel. When disassembling this tire-wheel assembly, the tire is removed from the wheel after voltage is applied between the wheel and the electrically conductive layer of the tire and electricity is passed through the electrically debonding adhesive.

6 Claims, 5 Drawing Sheets

TIRE-WHEEL ASSEMBLY AND DISASSEMBLY METHOD FOR THE SAME

PRIORITY CLAIM

This application is based upon and claims the benefit of priority from Japanese Patent Application No. 2009-160163, filed Jul. 6, 2009, the entire contents of which is incorporated herein by reference.

BACKGROUND

1. Technical Field

The present invention relates to a tire-wheel assembly and a disassembly method for the same, and particularly relates to a tire-wheel assembly and disassembly method for the same wherein relative shifting of a tire and a wheel when braking and/or cornering can be suppressed without negatively affecting tire replacement workability.

2. Related Art

Tire-wheel assemblies are constructed from a wheel and a tire assembled on an outer periphery of the wheel. It is known that effects of suppressing relative shifting in a circumferential direction of the tire and the wheel when braking and suppressing relative shifting in a lateral direction of the tire and the wheel when cornering can be obtained if the tire and the wheel are more tightly joined. Particularly, steering stability can be improved by suppressing relative shifting in the lateral direction of the tire and the wheel when cornering.

For example, Japanese Unexamined Patent Application Publication No. 2002-178723A proposes joining tires and wheels using an adhesive as a mean for more tightly joining tires and wheels. However, when a tire and a wheel are joined using an adhesive, there is a problem in that tire replacement workability is negatively affected due to difficulties in removing the tire from the wheel. Additionally, joining tires and wheels using fastener members such as nuts and bolts has been considered, but in this case as well tire replacement workability is negatively affected.

An object of the present invention is to provide a tire-wheel assembly and disassembly method for the same wherein relative shifting of a tire and a wheel when braking and/or cornering can be suppressed without negatively affecting tire replacement workability.

SUMMARY

In order to achieve the aforementioned object, the tire-wheel assembly of the present invention includes a wheel constructed from an electrically conductive material and a tire assembled on an outer peripheral side of the wheel, wherein an electrically conductive layer is formed on at least a part of a wheel contact surface of the tire, and an electrically debonding adhesive including an ionic liquid is interposed between the electrically conductive layer of the tire and the wheel.

Additionally, a disassembly method for the tire-wheel assembly of the present invention is a method for disassembling the tire-wheel assembly, wherein the tire is removed from the wheel after voltage is applied between the wheel and the electrically conductive layer of the tire and electricity is passed through the electrically debonding adhesive.

According to the present invention, the electrically conductive layer is formed on at least a part of the wheel contact surface of the tire, and the electrically debonding adhesive including the ionic liquid is interposed between the electrically conductive layer of the tire and the wheel. Therefore, not only can relative shifting of the tire and the wheel when braking or cornering can be suppressed due to an adhesion strength of the electrically debonding adhesive but steering stability when cornering can also be improved.

Additionally, when disassembling the tire-wheel assembly, the tire can be easily removed from the wheel because the adhesion strength of the electrically debonding adhesive falls due to the ionic liquid electrolyzing when voltage is applied between the wheel and the electrically conductive layer of the tire and electricity is passed through the electrically debonding adhesive. Thus, an adhesive effect of the electrically debonding adhesive can be taken advantage of without negatively affecting tire replacement workability.

In the present invention, an amount of the ionic liquid included in the electrically debonding adhesive is preferably from 0.1 to 30 weight %. Therefore, both the tire replacement workability and the adhesive effect can be realized at a higher level.

The electrically debonding adhesive is preferably disposed in a range from 30% to 100% of a length, measured along a meridian cross-section, of the wheel contact surface of the tire. Additionally the electrically debonding adhesive is preferably disposed in a range from 15% to 100% of an area of the wheel contact surface of the tire. Therefore, sufficient adhesive effect can be obtained.

The electrically conductive layer can be disposed on an entire circumference of the wheel contact surface of the tire. The electrically conductive layer preferably is continuous in the circumferential direction, but in a type of a tire that is divided into a plurality of sections along the circumferential direction, the electrically conductive layer may also be intermittently broken on the circumference. Additionally, it is possible to dispose the electrically conductive layer intermittently at intervals along the circumferential direction of the wheel contact surface of the tire. If the electrically conductive layer is rigid, disposing such an electrically conductive layer on the entire circumference of the wheel contact surface of the tire will cause problems when assembling the tire on the wheel, but workability related to assembling the tire on the wheel can be improved by disposing the electrically conductive layer intermittently. In this case, a releasing layer is preferably disposed in regions of the wheel contact surface of the tire where the electrically conductive layer does not exist. If the electrically debonding adhesive contacts the regions where the electrically conductive layer does not exist it will be difficult to separate that part, but separation of the tire can be performed easily by disposing the releasing layer in such regions.

The electrically conductive layer can be formed from an electrically conductive sheet material obtained by forming an electrically conductive material such as a metallic material or the like into a sheet, or from an electrically conductive film obtained through film formation by vapor deposition or coating of the electrically conductive material such as a metallic material or the like. In the case of the electrically conductive sheet material, a thickness thereof is favorably from 0.3 mm to 5 mm. In the case of the electrically conductive film, a thickness thereof is favorably from 0.001 mm to 0.3 mm. A choice as to which to use can be made as necessary based on a construction of the tire and the wheel.

DETAILED DESCRIPTION

Figure 1:
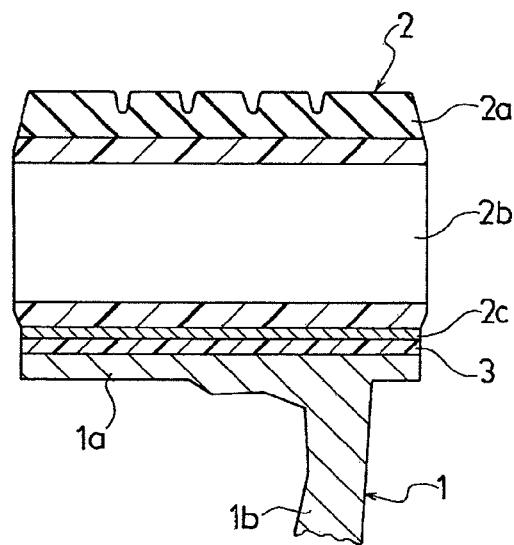
FIG. 1 is a meridional cross-sectional view showing a tire-wheel assembly constructed according to a first embodiment of the present invention.
Figure 2:
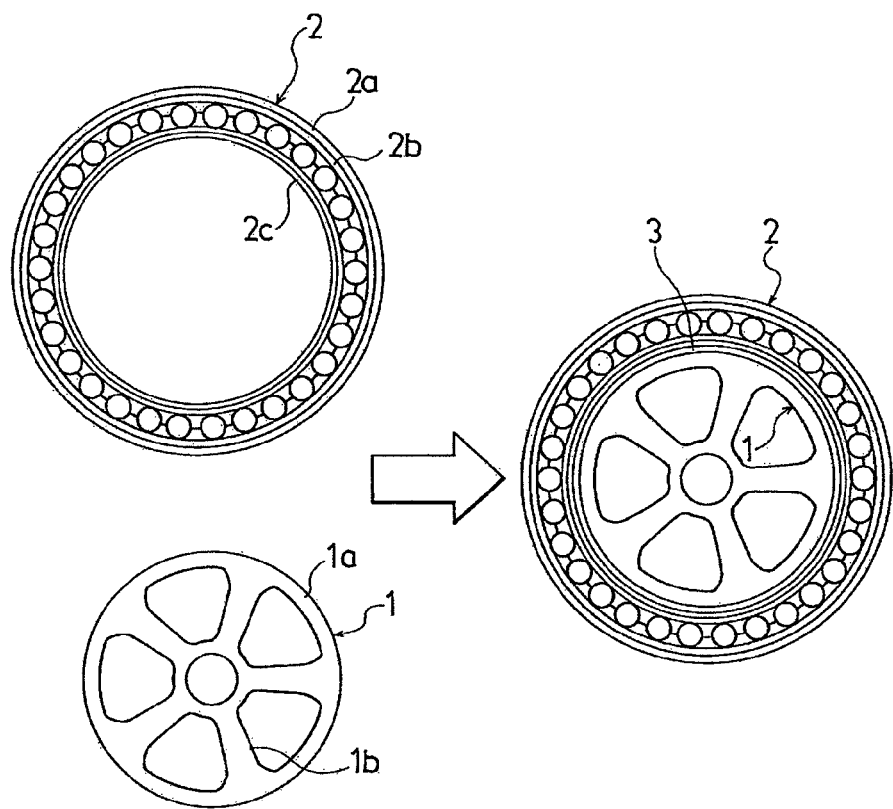
FIG. 2 is a meridional cross-sectional view showing an assembly method of the tire-wheel assembly constructed according to the first embodiment of the present invention.

Detailed descriptions will be given below of a configuration of the present invention with reference to the accompanying drawings. FIG. 1 and FIG. 2 show a tire-wheel assembly constructed according to a first embodiment of the present invention. The present embodiment is a tire-wheel assembly constructed from a non-pneumatic tire and a wheel.

As shown in FIG. 1 and FIG. 2, a wheel 1 is provided with a cylindrical rim part 1a, and a disk part 1b extending from the rim part 1a toward a wheel center axis. An overall diameter of the rim part 1a is constant along a wheel axial direction. The wheel 1 is constructed from an electrically conductive material such as a metallic material or the like.

Additionally, a tire 2 is provided with a circular tread part 2a, a spoke part 2b interposed between the tread part 2a and the rim part 1a of the wheel 1, and an electrically conductive layer 2c disposed on an inner circumferential surface of the spoke part 2b, said surface being in contact with the wheel 1. The tread part 2a is formed from an elastic material such as rubber or the like and has a belt layer (not shown) embedded therein. The spoke part 2b is molded from a synthetic resin, or the like, and has a construction in which a plurality of plate-like spokes connect an inner tube with an outer tube. The electrically conductive layer 2c is formed from an electrically conductive sheet material obtained by forming an electrically conductive material such as a metallic material or the like into a sheet, and is disposed throughout an entire circumference of a wheel contact surface so as to be continuous. The electrically conductive layer 2c is integrally joined to the spoke part 2b. Note that the electrically conductive layer 2c may be formed from an electrically conductive film obtained through film formation by vapor deposition or coating of the electrically conductive material such as a metallic material or the like.

When assembling the tire 2 on the outer peripheral side of the wheel 1, the tire 2 may be affixed to the rim part 1a of the wheel 1 after an electrically debonding adhesive 3 including an ionic liquid is coated onto one side of a contact surface of the wheel 1 and the tire 2; or, after determining assembly positions of the wheel 1 and the tire 2, both clearances may be filled with the electrically debonding adhesive 3 including the ionic liquid. In either case, the wheel 1 and the tire 2 can be tightly joined by the hardening of the electrically debonding adhesive 3.

According to the aforementioned tire-wheel assembly, the electrically conductive layer 2c is formed on the wheel contact surface of the tire 2, and the electrically debonding adhesive 3 including the ionic liquid is interposed between the electrically conductive layer 2c of the tire 2 and the wheel 1. Therefore, not only can relative shifting of the tire 2 and the wheel 1 when braking or cornering can be suppressed due to an adhesion strength of the electrically debonding adhesive 3 but steering stability when cornering can also be improved.

When disassembling the tire-wheel assembly, electricity is passed through the electrically debonding adhesive 3 by connecting an anode of a DC power supply to the wheel 1 and one side of the electrically conductive layer 2c of the tire 2 and connecting a cathode of the DC power supply to the wheel 1 and to another side of the electrically conductive layer 2c of the tire 2 and applying voltage between the wheel 1 and the electrically conductive layer 2c of the tire 2. For example, the voltage of the DC power supply may be from 1 to 200 V and an application time may be from 10 seconds to 10 minutes. Through this, the ionic liquid will electrolyze and the adhesion strength of the electrically debonding adhesive 3 will fall, resulting in being able to easily remove the tire 2 from the wheel 1. Thus, an adhesive effect by the electrically debonding adhesive 3 can be obtained without negatively affecting tire replacement workability.

Figure 3:
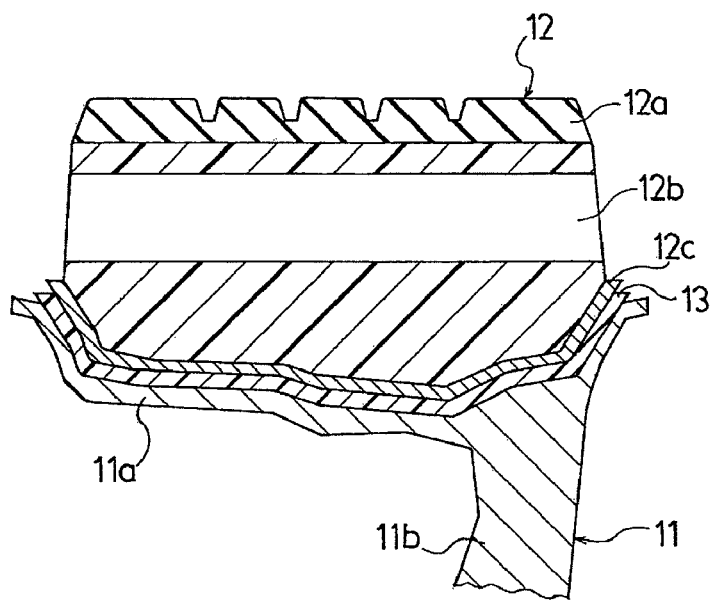
FIG. 3 is a meridional cross-sectional view showing a tire-wheel assembly constructed according to a second embodiment of the present invention.
Figure 4:
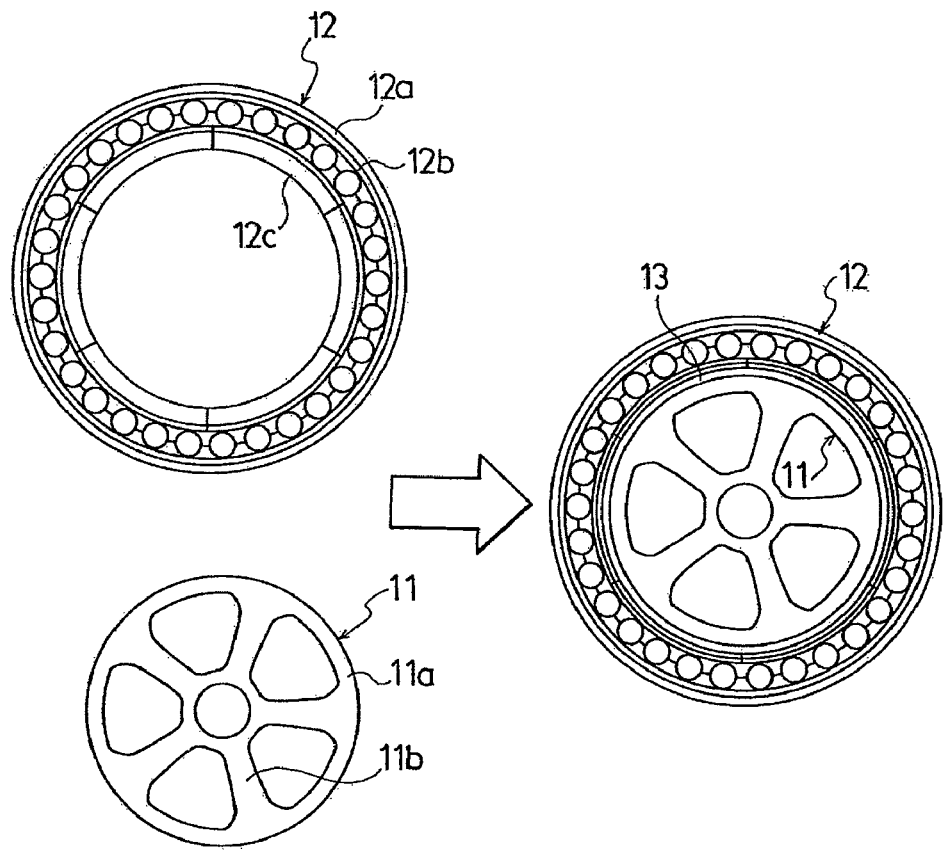
FIG. 4 is a meridional cross-sectional view showing an assembly method of the tire-wheel assembly constructed according to the second embodiment of the present invention.

FIG. 3 and FIG. 4 show a tire-wheel assembly constructed according to a second embodiment of the present invention. The present embodiment is a tire-wheel assembly constructed from a non-pneumatic tire and a wheel.

As shown in FIG. 3 and FIG. 4, a wheel 11 is provided with a cylindrical rim part 11a, and a disk part 11b extending from the rim part 11a toward a wheel center axis. The rim part 11a has a pair of flanges protruding toward an outer side of a wheel radial direction on both edges of the wheel axial direction. The wheel 11 is constructed from an electrically conductive material such as a metallic material or the like.

Additionally, a tire 12 is provided with a circular tread part 12a, a spoke part 12b interposed between the tread part 12a and the rim part 11a of the wheel 11, and an electrically conductive layer 12c disposed on an inner circumferential surface of the spoke part 12b, said surface being in contact with the wheel 11. The tread part 12a is formed from an elastic material such as rubber or the like and has a belt layer embedded therein. The spoke part 12b is molded from a synthetic resin, or the like, and has a construction in which a plurality of plate-like spokes connect an inner tube with an outer tube. The inner tube of the spoke part 12b is divided at six points on a circumference thereof so that the rim flange is cleared during rim assembly. The electrically conductive layer 12c is formed from an electrically conductive sheet material obtained by forming an electrically conductive material such as a metallic material or the like into a sheet, and is disposed throughout an entire circumference of a wheel contact surface, but is divided at six points on a circumference thereof like the inner tube of the spoke part 12b. The electrically conductive layer 12c is integrally joined to the spoke part 12b. Note that the electrically conductive layer 12c may be formed from an electrically conductive film obtained through film formation by vapor deposition or coating of the electrically conductive material such as a metallic material or the like.

When assembling the tire 12 on the outer peripheral side of the wheel 11, the tire 12 is affixed to the rim part 11a of the wheel 11, after an electrically debonding adhesive 13 including an ionic liquid is coated onto one side of a contact surface of the wheel 11 and the tire 12, by elastically deforming the plate-like spokes of the spoke part 12b and expanding the inner tube toward the outer side of the wheel radial direction. Furthermore, the wheel 11 and the tire 12 can be tightly joined by the hardening of the electrically debonding adhesive 13.

According to the aforementioned tire-wheel assembly, the electrically conductive layer 12c is formed on the wheel contact surface of the tire 12, and the electrically debonding adhesive 13 including the ionic liquid is interposed between the electrically conductive layer 12c of the tire 12 and the wheel 11. Therefore, not only can relative shifting of the tire 12 and the wheel 11 when braking or cornering can be suppressed due to an adhesion strength of the electrically debonding adhesive 13 but steering stability when cornering can also be improved.

When disassembling the tire-wheel assembly, electricity is passed through the electrically debonding adhesive 13 by connecting an anode of a DC power supply to the wheel 11 and one side of the electrically conductive layer 12c of the tire 12 and connecting a cathode of the DC power supply to the wheel 11 and to another side of the electrically conductive layer 12c of the tire 12 and applying voltage between the wheel 11 and the electrically conductive layer 12c of the tire 12. Through this, the ionic liquid will electrolyze and the adhesion strength of the electrically debonding adhesive 13 will fall, resulting in being able to easily remove the tire 12 from the wheel 11. Thus, an adhesive effect by the electrically debonding adhesive 13 can be obtained without negatively affecting tire replacement workability.

Figure 5:
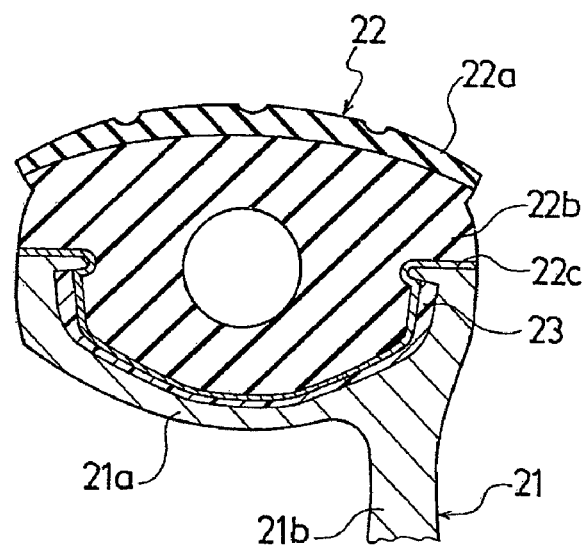
FIG. 5 is a meridional cross-sectional view showing a tire-wheel assembly constructed according to a third embodiment of the present invention.
Figure 6:
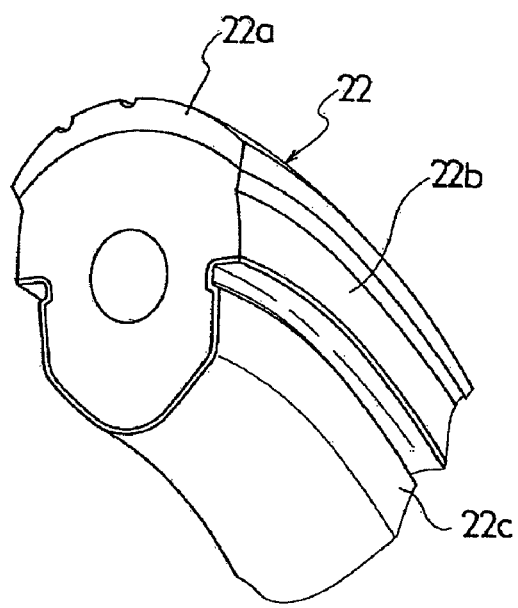
FIG. 6 is a cutaway perspective view showing a tire that forms the tire-wheel assembly constructed according to the third embodiment of the present invention.

FIG. 5 and FIG. 6 show a tire-wheel assembly constructed according to a third embodiment of the present invention. The present embodiment is a tire-wheel assembly constructed from a non-pneumatic tire and a wheel.

As shown in FIG. 5 and FIG. 6, a wheel 21 is provided with a cylindrical rim part 21a, and a disk part 21b extending from the rim part 21a toward a wheel center axis. The rim part 21a has a pair of flanges protruding toward an outer side of a wheel radial direction on both edges of the wheel axial direction. The edges of the flanges curve toward an inner side of the wheel axial direction and are configured so as to engage with the tire. The wheel 21 is constructed from an electrically conductive material such as a metallic material or the like.

Additionally, a tire 22 is provided with a circular tread part 22a, a base part 22b interposed between the tread part 22a and the rim part 21a of the wheel 21, and an electrically conductive layer 22c disposed on an inner circumferential surface of the base part 22b, said surface being in contact with the wheel 21. The tread part 22a is formed from an elastic material such as rubber or the like and has a belt layer (not shown) embedded therein. The base part 22b is formed from an elastic material such as rubber or the like and a cross-sectional circular continuous space is formed therein along a tire circumferential direction. The electrically conductive layer 22c is formed from an electrically conductive film obtained through film formation by vapor deposition or coating of the electrically conductive material such as a metallic material or the like, and is disposed throughout an entire circumference of a wheel contact surface.

When assembling the tire 22 on the outer peripheral side of the wheel 21, the tire 22 is affixed to the rim part 21a of the wheel 21, after an electrically debonding adhesive 23 including an ionic liquid is coated onto one side of a contact surface of the wheel 21 and the tire 22, while elastically deforming the base part 22b. At this time, the electrically conductive layer 22c formed from the electrically conductive film can follow the deformation of the base part 22b. Furthermore, the wheel 21 and the tire 22 can be tightly joined by the hardening of the electrically debonding adhesive 23.

According to the aforementioned tire-wheel assembly, the electrically conductive layer 22c is formed on the wheel contact surface of the tire 22, and the electrically debonding adhesive 23 including the ionic liquid is interposed between the electrically conductive layer 22c of the tire 22 and the wheel 21. Therefore, not only can relative shifting of the tire 22 and the wheel 21 when braking or cornering can be suppressed due to an adhesion strength of the electrically debonding adhesive 23 but steering stability when cornering can also be improved.

When disassembling the tire-wheel assembly, electricity is passed through the electrically debonding adhesive 23 by connecting an anode of a DC power supply to the wheel 21 and one side of the electrically conductive layer 22c of the tire 22 and connecting a cathode of the DC power supply to the wheel 21 and to another side of the electrically conductive layer 22c of the tire 22 and applying voltage between the wheel 21 and the electrically conductive layer 22c of the tire 22. Through this, the ionic liquid will electrolyze and the adhesion strength of the electrically debonding adhesive 23 will fall, resulting in being able to easily remove the tire 22 from the wheel 21. Thus, an adhesive effect by the electrically debonding adhesive 23 can be obtained without negatively affecting tire replacement workability.

In the third embodiment the electrically conductive layer 22c is formed from the electrically conductive film and is disposed throughout the entire circumference of the wheel contact surface. However, as shown in FIG. 7, the electrically conductive layer 22c may be formed from an electrically conductive sheet material obtained by forming an electrically conductive material such as a metallic material or the like into a sheet and may be disposed intermittently at intervals along a circumferential direction of the wheel contact surface.

Figure 7:
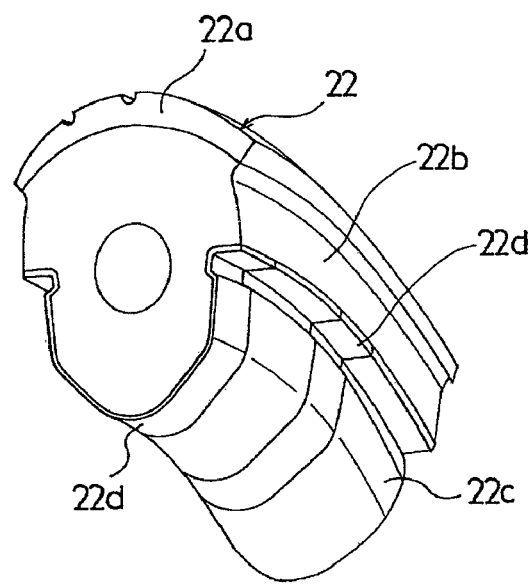
FIG. 7 is a cutaway perspective view showing a modified example of a tire that forms the tire-wheel assembly constructed according to the third embodiment of the present invention.

In FIG. 7, a releasing layer 22d is disposed in regions of the wheel contact surface of the tire 22 where the electrically conductive layer 22c does not exist. Specifically, the electrically conductive layer 22c and the releasing layer 22d are alternatingly disposed along the circumferential direction of the wheel contact surface. The releasing layer 22d is a layer that has been release treated by coating, etc., of a mold release material.

When assembling the tire 22 on the outer peripheral side of the wheel 21, the tire 22 is affixed to the rim part 21a of the wheel 21, after an electrically debonding adhesive 23 including an ionic liquid is coated onto one side of a contact surface of the wheel 21 and the tire 22, while elastically deforming the base part 22b. At this time, the regions where the electrically conductive layer 22c formed from the electrically conductive sheet material does not exist in the base part 22b take on the deformation that occurs during rim assembly. Furthermore, the wheel 21 and the tire 22 can be tightly joined by the hardening of the electrically debonding adhesive 23.

In this case as well, not only can relative shifting of the tire 22 and the wheel 21 when braking or cornering can be suppressed due to the adhesion strength of the electrically debonding adhesive 23 interposed between the electrically conductive layer 22c of the tire 22 and the wheel 21 but steering stability when cornering can also be improved.

When disassembling the tire-wheel assembly, electricity is passed through the electrically debonding adhesive 23 by connecting an anode of a DC power supply to the wheel 21 and one side of the electrically conductive layer 22c of the tire 22 and connecting a cathode of the DC power supply to the wheel 21 and to another side of the electrically conductive layer 22c of the tire 22 and applying voltage between the wheel 21 and the electrically conductive layer 22c of the tire 22. Such voltage applications are performed on an entirety of the electrically conductive layer 22c. Through this, the ionic liquid will electrolyze and the adhesion strength of the electrically debonding adhesive 23 will fall, resulting in being able to easily remove the tire 22 from the wheel 21.

Note that electrolysis of the ionic liquid does not occur between the wheel 21 and the releasing layer 22d of the tire 22, but the electrically debonding adhesive 23 is easy to remove from the releasing layer 22d. Therefore, this will not inhibit disassembly work of the tire-wheel assembly. Thus, an adhesive effect by the electrically debonding adhesive 23 can be obtained without negatively affecting tire replacement workability.

Figure 8:
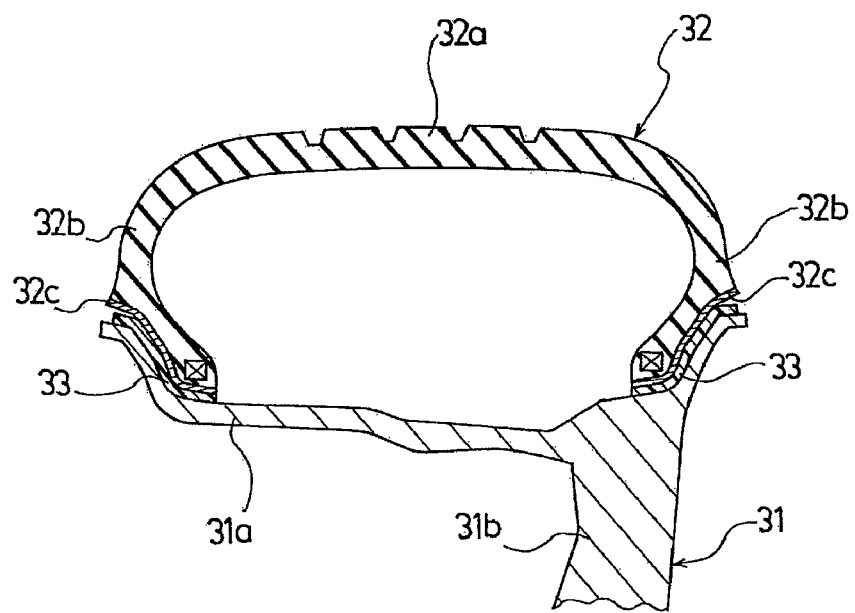
FIG. 8 is a meridional cross-sectional view showing a tire-wheel assembly constructed according to a fourth embodiment of the present invention.
Figure 9:
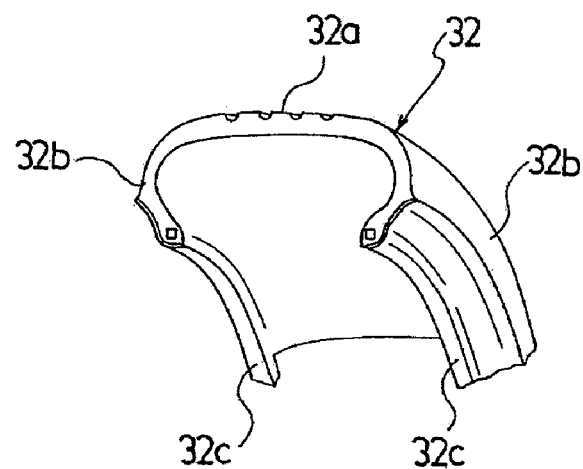
FIG. 9 is a cutaway perspective view showing a tire that forms the tire-wheel assembly constructed according to the fourth embodiment of the present invention.

FIG. 8 and FIG. 9 show a tire-wheel assembly constructed according to a fourth embodiment of the present invention. The present embodiment is a tire-wheel assembly constructed from a pneumatic tire and a wheel.

As shown in FIG. 8 and FIG. 9, a wheel 31 is provided with a cylindrical rim part 31a, and a disk part 31b extending from the rim part 31a toward a wheel center axis. The rim part 31a has a pair of flanges protruding toward an outer side of a wheel radial direction on both edges of the wheel axial direction. The wheel 31 is constructed from an electrically conductive material such as a metallic material or the like.

Additionally, a tire 32 is provided with a circular tread part 32a, a pair of left and right side parts 32b that extend from the tread part 32a to the rim part 31a of the wheel 31, and an electrically conductive layer 32c disposed on an inner circumferential surface of each of the side parts 32b, said surface being in contact with the wheel 31. The tread part 32a is formed from an elastic material such as rubber or the like and has a belt layer (not shown) embedded therein. The side parts 32b are formed from an elastic material such as rubber or the like and have bead cores embedded at positions on an inner circumferential side thereof. The electrically conductive layer 32c is formed from an electrically conductive film obtained through film formation by vapor deposition or coating of the electrically conductive material such as a metallic material or the like, and is disposed throughout an entire circumference of a wheel contact surface.

When assembling the tire 32 on the outer peripheral side of the wheel 31, the tire 32 is affixed to the rim part 31a of the wheel 31, after an electrically debonding adhesive 33 including an ionic liquid is coated onto one side of a contact surface of the wheel 31 and the tire 32, while elastically deforming the side parts 32b. At this time, the electrically conductive layer 32c formed from the electrically conductive film can follow the deformation of the side parts 32b. Furthermore, the wheel 31 and the tire 32 can be tightly joined by the mated condition of the tire 32 with the rim part 31a caused by filling an inside of the tire 32 with air pressure and the hardening of the electrically debonding adhesive 33.

According to the aforementioned tire-wheel assembly, the electrically conductive layer 32c is formed on the wheel contact surface of the tire 32, and the electrically debonding adhesive 33 including the ionic liquid is interposed between the electrically conductive layer 32c of the tire 32 and the wheel 31. Therefore, not only can relative shifting of the tire 32 and the wheel 31 when braking or cornering can be suppressed due to an adhesion strength of the electrically debonding adhesive 33 but steering stability when cornering can also be improved.

When disassembling the tire-wheel assembly, electricity is passed through the electrically debonding adhesive 33 by connecting an anode of a DC power supply to the wheel 31 and one side of the electrically conductive layer 32c of the tire 32 and connecting a cathode of the DC power supply to the wheel 31 and to another side of the electrically conductive layer 32c of the tire 32 and applying voltage between the wheel 31 and the electrically conductive layer 32c of the tire 32. Through this, the ionic liquid will electrolyze and the adhesion strength of the electrically debonding adhesive 33 will fall, resulting in being able to easily remove the tire 32 from the wheel 31. Thus, an adhesive effect by the electrically debonding adhesive 33 can be obtained without negatively affecting tire replacement workability.

In the fourth embodiment the electrically conductive layer 32c is formed from the electrically conductive film and is disposed throughout the entire circumference of the wheel contact surface. However, as shown in FIG. 10, the electrically conductive layer 32c may be formed from an electrically conductive sheet material obtained by forming an electrically conductive material such as a metallic material or the like into a sheet and may be disposed intermittently at intervals along a circumferential direction of the wheel contact surface.

Figure 10:
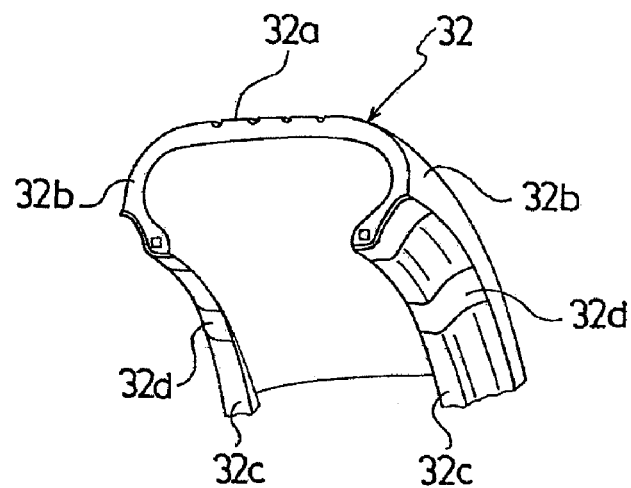
FIG. 10 is a cutaway perspective view showing a modified example of a tire that forms the tire-wheel assembly constructed according to the fourth embodiment of the present invention.

In FIG. 10, a releasing layer 32d is disposed in regions of the wheel contact surface of the tire 32 where the electrically conductive layer 32c does not exist. Specifically, the electrically conductive layer 32c and the releasing layer 32d are alternatingly disposed along the circumferential direction of the wheel contact surface. The releasing layer 32d is a layer that has been release treated by coating, etc., of a mold release material. Note that disposition patterns of the electrically conductive layer 32c and the releasing layer 32d may be mutually different on the left and right side parts 32b.

When assembling the tire 32 on the outer peripheral side of the wheel 31, the tire 32 is affixed to the rim part 31a of the wheel 31, after an electrically debonding adhesive 33 including an ionic liquid is coated onto one side of a contact surface of the wheel 31 and the tire 32, while elastically deforming the side parts 32b. At this time, the regions where the electrically conductive layer 32c formed from the electrically conductive sheet material does not exist in the side parts 32b take on the deformation that occurs during rim assembly. Furthermore, the wheel 31 and the tire 32 can be tightly joined by the mated condition of the tire 32 with the rim part 31a caused by filling an inside of the tire 32 with air pressure and the hardening of the electrically debonding adhesive 33.

In this case as well, not only can relative shifting of the tire 32 and the wheel 31 when braking or cornering can be suppressed due to the adhesion strength of the electrically debonding adhesive 33 interposed between the electrically conductive layer 32c of the tire 32 and the wheel 31 but steering stability when cornering can also be improved.

When disassembling the tire-wheel assembly, electricity is passed through the electrically debonding adhesive 33 by connecting an anode of a DC power supply to the wheel 31 and one side of the electrically conductive layer 32c of the tire 32 and connecting a cathode of the DC power supply to the wheel 31 and to another side of the electrically conductive layer 32c of the tire 32 and applying voltage between the wheel 31 and the electrically conductive layer 32c of the tire 32. Such voltage applications are performed on an entirety of the electrically conductive layer 32c. Through this, the ionic liquid will electrolyze and the adhesion strength of the electrically debonding adhesive 33 will fall, resulting in being able to easily remove the tire 32 from the wheel 31.

Note that electrolysis of the ionic liquid does not occur between the wheel 31 and the releasing layer 32d of the tire 32, but the electrically debonding adhesive 33 is easy to remove from the releasing layer 32d. Therefore, this will not inhibit disassembly work of the tire-wheel assembly. Thus, an adhesive effect by the electrically debonding adhesive 33 can be obtained without negatively affecting tire replacement workability.

In each of the described embodiments, the electrically debonding adhesive is interposed between the wheel and the electrically conductive layer of the tire, but it is not absolutely necessary to dispose the electrically debonding adhesive in all regions of the wheel contact surface of the tire. It is favorable that the electrically debonding adhesive be disposed in a range from 30% to 100% of a length, measured along a meridian cross-section, of the wheel contact surface of the tire. Additionally, it is favorable that the electrically debonding adhesive be disposed in a range from 15% to 100% of an area of the wheel contact surface of the tire. If the range of disposal of the electrically debonding adhesive it too great or too small, the adhesive effect will be insufficient.

Next, the electrically debonding adhesive for use in the present invention will be described. The electrically debonding adhesive has a composition that includes an ionic liquid, but it may further include a polymer as an adhesive component. Additionally, from a perspective of applying electricity to electrolyze the ionic liquid, the electrically debonding adhesive preferably includes an electrically conductive filler. A detailed description of the ionic liquid, the polymer, and the electrically conductive filler are given below.

Ionic Liquid

The ionic liquid is a molten salt that is a liquid at room temperature (sometimes called "ordinary temperature molten salt") and has properties such as not having vapor pressure (nonvolatile), having high heat resistance, being incombustible, being chemically stable, and the like.

Because the electrically debonding adhesive includes such an ionic liquid, when electricity is passed through the electrically debonding adhesive after adhering, electrolysis of the ionic liquid occurs, anions migrate to an anode side causing oxidation, and cations migrate to a cathode side causing reduction. As a result, interfacial adhesion weakens, which facilitates separation. The ionic liquid includes cations and, as counterions thereto, anions. Specific examples of preferred cations include the cations of Formula (1) or (2) below.

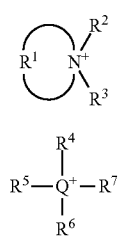

(1)

(2)

In Formula (1), $R^1$ is a hydrocarbon group having 1 to 20 carbons that may include a nitrogen atom; and $R^2$ and $R^3$ are each independently a hydrogen atom or an alkyl group having 1 to 20 carbons that may include a heteroatom. However, there is no $R^3$ moiety if the nitrogen atom includes a double bond.

In formula (2), Q is a nitrogen, phosphorus, sulfur, or carbon atom; and $R^4$, $R^5$, $R^6$, and $R^7$ are each independently a hydrogen atom or an alkyl group having 1 to 8 carbons that may include a heteroatom. However, there is no $R^7$ moiety if Q is a sulfur atom.

Examples of the cation of Formula (1) include cyclic amidine ions such as imidazolium ions, and the like, and pyridinium ions. Specific examples of preferred cations include the cations of any of Formulas (3) to (5) below.

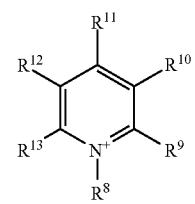

(3)

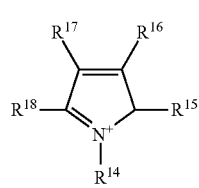

(4)

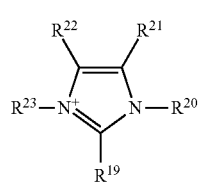

(5)

In Formulas (3) to (5), $R^8$ through $R^{23}$ are each independently a hydrocarbon group having 1 to 20 carbons that may have a nitrogen atom.

More specific examples include the following cations.

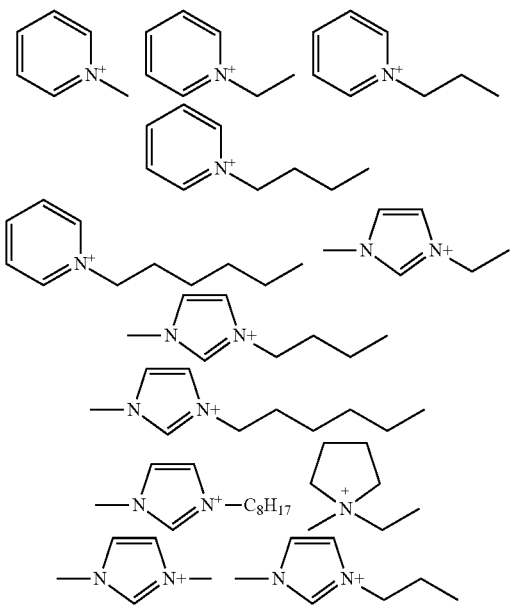

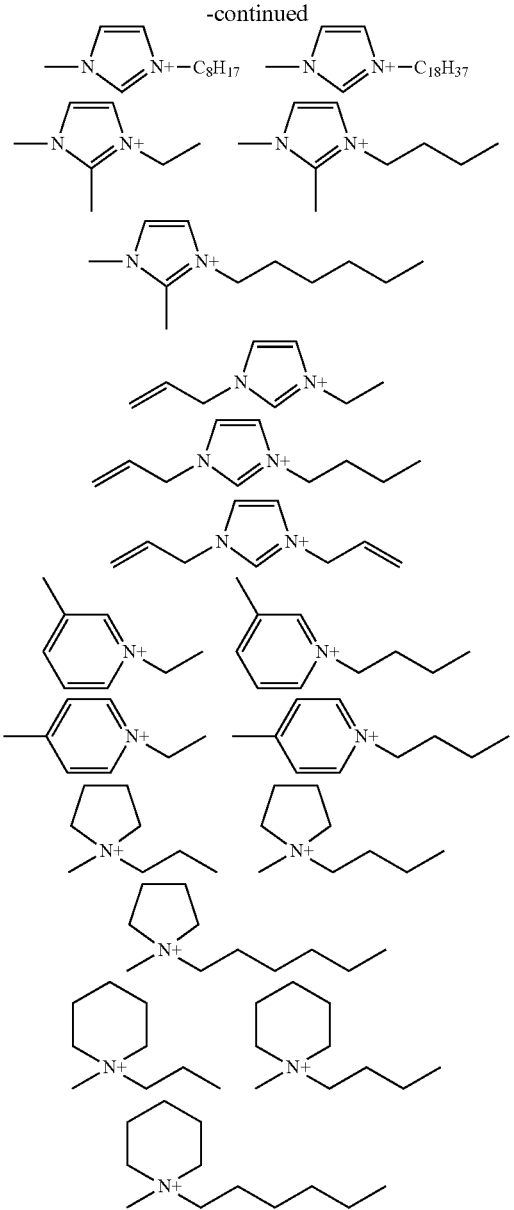

Examples of the cation of Formula (2) include organic cations such as ammonium ions, sulfonium ions, phosphonium ions, and the like. Specific examples include the following cations.

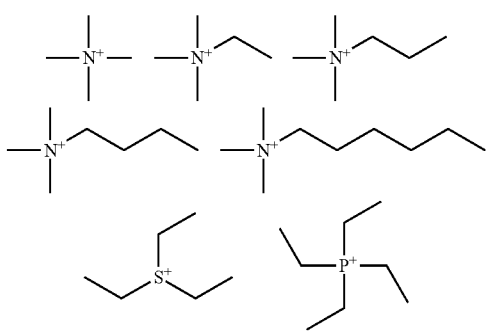

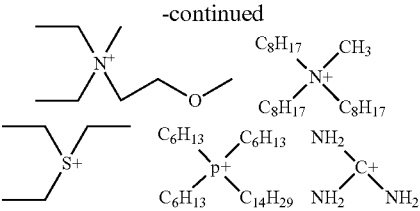

Preferred examples of the anion specifically include $Br^-$, $AlCl_4^-$, $Al_2Cl_7^-$, $NO_3^-$, $BF_4^-$, $PF_6^-$, $CH_3COO^-$, $CF_3COO^-$, $CF_3SO_3^-$, $(CF_3SO_2)_2N^-$, $(CF_3SO_2)_3C^-$, $AsF_6^-$, $SbF_6^-$, $F(HF)_n^-$, $CF_3CF_2CF_2SO_3^-$, $(CF_3CF_2SO_2)_2N^-$, $CF_3CF_2CF_2COO^-$, and the like. Of these, $BF_4^-$, $PF_6^-$, and $(CF_3SO_2)_2N^-$ are preferred for their low melting points and high heat resistance.

Examples of the ionic liquid include combinations of the above-mentioned cations, anions, and the like. Commercial products can be used as the ionic liquid. For example, the products IL-A2, IL-C3, IL-P10, and IL-P14 (all manufactured by Koei Chemical Co., Ltd.,) shown below can be used. Such ionic liquids are also available from Nisshinbo Industries, Inc., Nippon Synthetic Chemical Industry Co., Ltd., Toyo Gosei Co., Ltd., Tokyo Chemical Industry Co., Ltd., and Sigma-Aldrich Japan Co., Ltd.

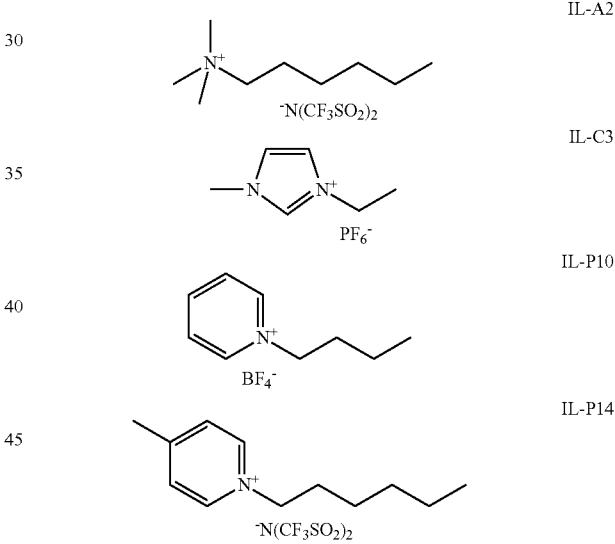

In the present invention, from the perspective of easier separation of the electrically debonding adhesive from an adherend, that is, from the perspective of separating at normal temperatures (from about 0 to 45° C.), a melting point of the ionic liquid is preferably 100° C. or lower, more preferably 60° C. or lower, and even more preferably room temperature or lower.

Additionally, in the present invention, an amount of the ionic liquid included in the electrically debonding adhesive is preferably from 0.1 to 30 weight %, and more preferably from 1.0 to 10 weight %. If the amount of the ionic liquid included is too small, separatability from the adherend will decrease, and if the amount of the ionic liquid included is too large, the adhesive effect will decrease. However, if the amount of the ionic liquid included is within this range, both the tire replacement workability and the adhesive effect can be realized at a higher level.

Polymer

The polymer is not particularly limited, so long as it is a common organic polymeric compound. The polymer may also be an oligomer having a number-average molecular weight of about 1,000. Examples of the polymer include thermoplastic synthetic resins such as polyolefin resins, polyolefin emulsions, EVA (ethylene-vinyl acetate copolymer) resins, vinyl acetate resins, vinyl acetate copolymers, ionomer resins, acrylic resins, acrylic copolymers, cyanoacrylate resins, vinyl chloride resins, polyvinyl acetal resins, polyurethane resins, polyester resins, polyamide resins, and the like; thermosetting synthetic resins such as acrylic resins, maleimide resins, urea resins, melamine resins, phenolic resins, epoxy-phenolic resins, epoxy resins, polyurethane resins, urethane prepolymers, unsaturated polyester resins, diallyl phthalate resins, and the like; moisture-curing resins such as urethane prepolymers, modified silicone resins, and the like; synthetic rubbers such as chloroprene rubber, nitrile rubber, styrene-butadiene rubber, and the like; natural rubber; reclaimed rubber; and natural polymers such as starches, proteins, natural resins, and asphalt/tar; and the like.

Preferred examples of the polymer specifically include the urethane prepolymers, epoxy resins, and modified silicone resins described below.

Urethane Prepolymer

The urethane prepolymers are, like ordinary one-component polyurethane resin compositions, reaction products obtained by reacting a polyol compound with an excess of a polyisocyanate compound (i.e., an excess of isocyanate (NCO) groups with respect to hydroxyl (OH) groups), and generally include from 0.5 to 10 weight % of NCO groups at the ends of the molecule. The NCO groups on the urethane prepolymers react with moisture in air to form crosslink moieties, which is advantageous from the perspective that the electrically debonding adhesive of the present invention can be used as moisture-curing adhesives.

The polyisocyanate compound used to form the urethane prepolymer is not particularly limited, provided it has two or more NCO groups in the molecule, and specific examples include aromatic polyisocyanates such as 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), tolidine diisocyanate (TODI), 1,5-naphthalene diisocyanate (NDI), polymethylenephenylene polyisocyanate (polymeric MDI), triphenylmethane triisocyanate, and the like; aliphatic polyisocyanates such as hexamethylene diisocyanate (HDI), trimethylhexamethylene diisocyanate (TMHDI), lysine diisocyanate, norbornane diisocyanate (NBDI), and the like; alicyclic polyisocyanates such as transcyclohexane-1,4-diisocyanate, isophorone diisocyanate (IPDI), $H_6$XDI (hydrogenated XDI) $H_{12}$MDI (hydrogenated MDI), $H_6$TDI (hydrogenated TDI), and the like; carbodiimide-modified polyisocyanates of these isocyanate compounds; isocyanurate-modified polyisocyanates of these isocyanate compounds; and urethane prepolymers obtained by reacting these isocyanate compounds with the subsequently described polyol compounds; and the like. These polyisocyanate compounds may be used alone or may be used in any combination of two or more types. In addition, monoisocyanate compounds having only one NCO group in the molecule may be used in admixture with a diisocyanate compound or the like.

The polyol compound used to form the urethane prepolymer is not particularly limited with respect to its molecular weight, skeleton, and the like, provided it is a compound having two or more OH groups. Examples of the polyol compound include low-molecular-weight polyhydric alcohols, polyether polyols, polyester polyols, other types of polyols, polyol mixtures thereof, and the like.

Specific examples of the low-molecular-weight polyhydric alcohol include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin 1,1,1-trimethylolpropane (TMP), 1,2,5-hexanetriol, pentaerythritol, and the like; sugars such as sorbitol and the like; and the like.

The polyether polyols and polyester polyols may generally be compounds derived from the low-molecular-weight polyhydric alcohols, but in the present invention, compounds derived from aromatic diols, amines, and alkanolamines shown below may also be favorably used.

Here, specific examples of the aromatic diol include resorcin (m-dihydroxybenzene), xylylene-glycol, 1,4-benzene dimethanol, styrene glycol, 4,4'-dihydroxyethyl phenol; and compounds having bisphenol skeletons of a bisphenol A structure (4,4'-dihydroxyphenylpropane), a bisphenol F structure (4,4'-dihydroxyphenylmethane), a brominated bisphenol A structure, a hydrogenated bisphenol A structure, a bisphenol S structure, and a bisphenol AF structure shown below.

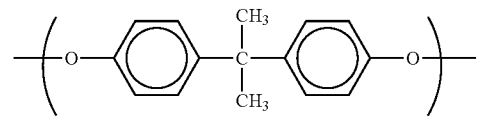

BISPHENOL A STRUCTURE

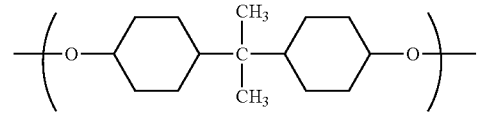

HYDROGENATED BISPHENOL A STRUCTURE

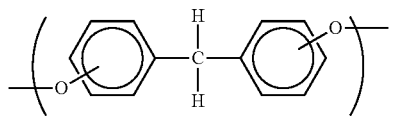

BISPHENOL F STRUCTURE

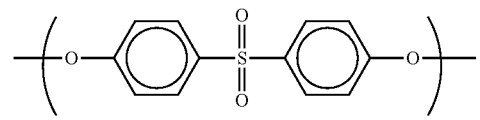

BISPHENOL S STRUCTURE

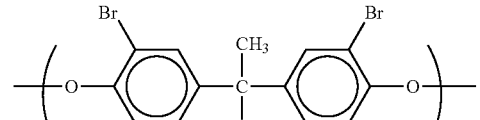

BROMINATED BISPHENOL A STRUCTURE

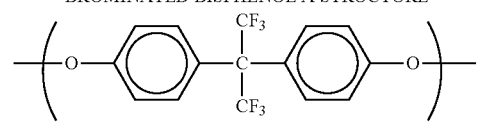

BISPHENOL AF STRUCTURE

Additionally, specific examples of the amines include ethylenediamine, hexamethylenediamine, and the like. Specific examples of the alkanolamine include ethanolamine, propanolamine, and the like.

Examples of the polyether polyols include polyols obtained by adding at least one oxide selected from the group consisting of styrene oxide and alkylene oxides such as ethylene oxide, propylene oxide, butylene oxide (tetramethylene oxide), tetrahydrofuran, and the like to at least one compound selected from the low-molecular-weight polyhydric alcohols, the aromatic diols, the amines, and the alkanolamines.

Specific examples of the polyether polyols include polyethylene glycol, polypropylene glycol (PPG), polypropylene triol, ethylene oxide/propylene oxide copolymers, polytetramethylene ether glycol (PTMEG), polytetraethylene glycol, sorbitol polyols, and the like.

Additionally, specific examples of the polyether polyols having bisphenol skeletons include polyether polyols obtained by adding ethylene oxide and/or propylene oxide to bisphenol A (4,4'-dihydroxyphenylpropane).

Likewise, examples of the polyester polyols include the condensation products (condensed polyester polyols) of any of the low-molecular-weight polyhydric alcohols, the aromatic diols, the amines, or the alkanolamines with a polybasic carboxylic acid; lactone polyols; polycarbonate polyols; and the like.

Specific examples of the polybasic carboxylic acids which may be used here to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acids, oligomeric acids, castor oil, hydroxycarboxylic acids such as a reaction product of castor oil with ethylene glycol (or propylene glycol), and the like.

Additionally, specific examples of the lactone polyols include compounds obtained by ring-opening polymerization of a lactone such as propiolactone, valerolactone, ε-caprolactone, α-methyl-ε-caprolactone, ε-methyl-ε-caprolactone, or the like with a suitable polymerization initiator, and having hydroxy groups at both ends.

Examples of the polyester polyols having a bisphenol skeleton include condensed polyester polyols obtained by using, in place of the low-molecular-weight polyhydric alcohol, or together with the low-molecular-weight polyhydric alcohol, a bisphenol skeleton having a diol. Specific examples include polyester polyols obtained from bisphenol A and castor oil; polyester polyols obtained from bisphenol A, castor oil, ethylene glycol and propylene glycol; and the like.

Examples of other polyols include polymeric polyols having carbon-carbon bonds on a main-chain skeleton, such as acrylic polyols, polybutadiene polyols, hydrogenated polybutadiene polyols, and the like.

In the present invention, the various polyol compounds mentioned above may be used alone or may be used in any combination of two or more types. Of these, from the perspective of material availability, polypropylene glycol is preferable.

The urethane prepolymer that can be preferably used in the adhesive of the present invention is, as described above, obtained by reacting a polyol compound with an excess of a polyisocyanate compound, and specific examples include compounds obtained by combining any of the various polyol compounds mentioned above with any of the various polyisocyanate compounds mentioned above.

In the present invention, it is preferable that the above-mentioned polyurethane prepolymer have a polyether structure on the main chain because such a polyurethane prepolymer has a lower glass transition temperature, easier migration of the cations and anions when an electrical current is applied, the urethane polymer is synthesized at a low viscosity, and the adhesive containing the urethane polymer is flexible.

Epoxy Resin

The epoxy resin is a resin composed of a compound having two or more oxirane rings (epoxy groups) in the molecule, and generally has an epoxy equivalent weight of from 90 to 2,000. Conventionally known epoxy resins can be used as the epoxy resin.

Specific examples include difunctional glycidyl ether epoxy resins such as bisphenol group-bearing epoxy compounds (e.g., bisphenol A, bisphenol F, brominated bisphenol A, hydrogenated bisphenol A, bisphenol S, bisphenol AF, biphenyl, and the like epoxy compounds), polyalkylene glycol and alkylene glycol epoxy compounds, naphthalene ring-bearing epoxy compounds, fluorene group-containing epoxy compounds, and the like; polyfunctional glycidyl ether epoxy compounds (e.g., phenolic novolak, orthocresol novolak, DPP novolak, trishydroxyphenylmethane, trifunctional, tetraphenylethane, and the like epoxy compounds); glycidyl ester epoxy resins of synthetic fatty acids such as dimer acid and the like; glycidylamino group-bearing aromatic epoxy resins (glycidylamine epoxy resins), such as N,N,N',N'-tetraglycidyldiaminodiphenylmethane (TGDDM) of formula (6) below, tetraglycidyldiaminodiphenylsulfone (TGDDS), tetraglycidyl-m-xylylenediamine (TGMXDA), triglycidyl-p-aminophenol of formula (7) below, triglycidyl-m-aminophenol, N,N-diglycidylaniline, tetraglycidyl-1,3-bisaminomethylcyclohexane (TG1,3-BAC), triglycidyl isocyanurate (TGIC), and the like; epoxy compounds having the tricyclo[5,2,1,0$^{2,6}$] decane ring shown in formula (8) below, such as epoxy compounds which can be prepared by a known method that involves polymerizing dicyclopentadiene with a cresol such as metacresol, or the like, or a phenol, then reacting epichlorohydrin; alicyclic epoxy resins; epoxy resins having a sulfur atom in the epoxy resin main chain, such as Flep 10 produced by Toray Thiokol Co., Ltd.; urethane-modified epoxy resins having urethane bonds; and rubber-modified epoxy resins containing polybutadiene, liquid polyacrylonitrile-butadiene rubber or acrylonitrile-butadiene rubber (NBR).

(6)

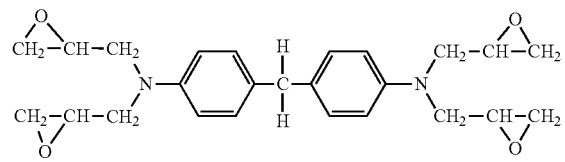

(7)

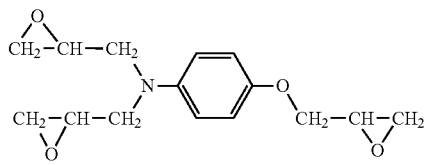

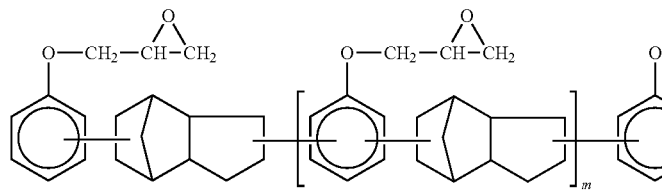
(8)

(wherein m is an integer from 0 to 15).

In the present invention, the various epoxy resins mentioned above may be used alone or may be used in any combination of two or more types. Commercial products can be used as these epoxy resins. Specific examples of commercial products that can be used include bisphenol A epoxy resins such as Epikote 828 and Epikote 154 (both manufactured by Japan Epoxy Resin); bisphenol A epoxy resins such as EP-4100 (manufactured by Asahi Denka Kogyo K.K.); bisphenol F epoxy resins such as Epikote 806 and Epikote 807 (both manufactured Japan Epoxy Resin; and the like.

Additionally, in the present invention, when such an epoxy resin is used, it is preferable to use a curing agent capable of reacting with the epoxy resin. By including the curing agent, even when using the epoxy resin, it is possible to use the adhesive of the present invention as a room temperature-curing adhesive.

Specific examples of such curing agents include amine compounds, acid anhydride compounds, amide compounds, phenolic compounds, thiol compounds, imidazole, boron trifluoride-amine complexes, guanidine derivatives, and the like. Of these, amine compounds and thiol compounds are preferable. Using a general-purpose bisphenol A epoxy resin as the epoxy resin is especially preferable because use of polyamide amine and polythiol can bring the glass transition temperature for the cured material close to room temperature.

Modified Silicone Resin

The modified silicone resin is a polymer having alkylene oxide monomer units on the main chain and having at least one group containing hydrolyzable silicon per molecule.

In the present invention, the group containing hydrolyzable silicon may be present at an end of the polymer molecule and/or on a side chain.

Examples of the alkylene oxide monomer units present on the main chain of the modified silicone resin include constitutional repeating units such as —CH$_2$CH$_2$O—, —CH$_2$CH(CH$_3$)O—, —CH$_2$CH(C$_2$H$_5$)O—, —CH(CH$_3$)CH$_2$O—, —CH(C$_2$H$_5$)CH$_2$O—, —CH$_2$CH$_2$CH$_2$O—, —CH$_2$CH$_2$CH$_2$CH$_2$O—, and the like. The modified silicone resin may be composed of only one such type of constitutional repeating unit or of two or more types.

The group containing hydrolyzable silicon in the modified silicone resin is a silicon-containing group which has a hydroxyl group and/or a hydrolyzable group bonded to a silicon atom, and which, in the presence of moisture or a crosslinking agent and, if necessary, with the use of a catalyst or the like, is capable of crosslinking by causing a condensation reaction and thus forming siloxane bonds. Examples of such groups include alkoxysilyl groups, alkenyloxysilyl groups, acylokysilyl groups, aminosilyl groups, aminoxysilyl groups, oximesilyl groups, and amidosilyl groups.

More specific examples of such groups that can be preferably used include the alkoxysilyl groups, alkenyloxysilyl groups, acyloxysilyl groups, aminosilyl groups, aminoxysilyl groups, oximesilyl groups, and amidosilyl groups of the following formulas.

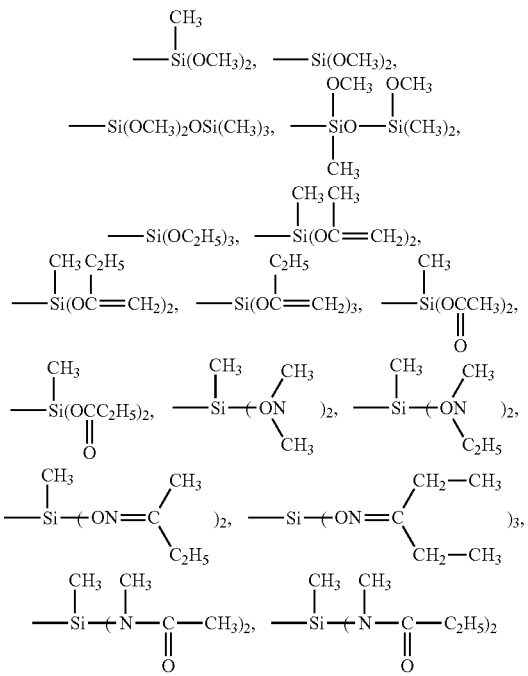

Of these, alkoxysilyl groups are preferred from the standpoint of ease of handleability. The alkoxy group bonded to the silicon atom on the alkoxysilyl group is not particularly limited, but the alkoxy group is preferably a methoxy group, an ethoxy group, or a propoxy group because raw materials for such are readily available.

Groups other than the alkoxy group bonded to the silicon atom on the alkoxysilyl group are not subject to any particular limitation, although preferred examples include hydrogen atoms, and alkyl groups, alkenyl groups, and arylalkyl groups that have 20 carbon atoms or less, such as methyl groups, ethyl groups, propyl groups, isopropyl groups, and the like.

In the present invention, the modified silicone resin is preferably an alkoxysilane with a functionality of two or more which has two or more alkoxysilyl groups in the molecule. Alkoxysilanes with a functionality of 3 to 20 are more preferred because raw materials for such are readily available.

Additionally, the molecular weight of the modified silicone resin is not particularly limited, but from the perspectives of workability and the like, a number-average molecular weight indicated as the molecular weight of polystyrene, as determined by gel permeation chromatography (GPC) is preferably 50,000 or less.

Examples of the modified silicone resins that can be used include known resins such as those mentioned in the following patent publications: JP 45-36319 B, JP 46-12154 B, JP 49-32673 B, JP 50-156599 A, JP 51-73561 A, JP 54-6096 A, JP 55-82123 A, JP 55-123620 A, JP 55-125121 A, JP 55-131022 A, JP 55-135135 A, JP 55-137129 A, JP 3-72527 A, and the like. Examples of commercial products that can be used include MS3P S203, S303, S810, and S943 (all manufactured by Kaneka Corporation); and EXCESTAR ES-S2410, ES-S2420, ES-S3430 and ES-S3630 (all manufactured by Asahi Glass Co., Ltd.).

In the present invention, from the perspective of easier separation of the electrically debonding adhesive from the adherend, that is, from the perspective of separation at normal temperatures (from about 0 to 45° C.), a glass transition temperature of the polymer is preferably 30° C. or lower. Additionally, in the present invention, from the perspective of facilitating migration of the cations and anions when electricity is passed through the electrically debonding adhesive, the glass transition temperature of the polymer is preferably 30° C. or lower.

Furthermore, the polymer is preferably a urethane prepolymer because adhesion is possible by moisture-curing a one-part adhesive and the glass transition temperature is low.

Electrically Conductive Filler

The electrically conductive filler is not particularly limited, and any known conventional electrically conductive filler can be used, provided it is an additive having electrical conductivity. Preferable specific examples of the electrically conductive filler include graphite, carbon black, and carbon fibers; metal powders such as silver and copper; and the like.

In the present invention, a content of the electrically conductive filler is preferably from 1 to 200 parts by weight, and more preferably from 10 to 100 parts by weight, per 100 parts by weight of the polymer. When the content of the electrically conductive filler is in this range, the electrically debonding adhesive will display sufficient electrical conductivity, and therefore is favorable.

As necessary, it is preferable that the electrically debonding adhesive includes a silane coupling agent. The silane coupling agent is not particularly limited, provided it is a silane coupling agent that is a known conventional adhesion promoter. Specific examples of the silane coupling agent include aminosilanes, vinylsilanes, epoxysilanes, methacrylsilanes, isocyanatosilanes, ketimine silanes, and mixtures or reaction products thereof; or compounds obtained by reacting any of these with a polyisocyanate.

The aminosilanes are not particularly limited, provided it is a compound including an amino group or imino group and a hydrolyzable silicon-containing group, and examples include 3-aminopropyltrimethoxysilane, 3-aminopropyltriethoxysilane, 3-aminopropylmethyldimethoxysilane, 3-aminopropylethyldiethoxysilane, bistrimethoxysilylpropylamine, bistriethoxysilylpropylamine, bismethoxydimethoxysilylpropylamine, bisethoxydiethoxysilylpropylamine, N-2-(aminoethyl)-3-aminopropyltrimethoxysilane, N-2-(aminoethyl)-3-aminopropylmethyldimethoxysilane, N-2-(aminoethyl)-3-aminopropyltriethoxysilane, N-2-(aminoethyl)-3-aminopropylethyldiethoxysilane, and the like.

Examples of the vinylsilanes include vinyltrimethoxysilane, vinyltriethoxysilane, tris(2-methoxyethoxy)vinylsilane, and the like.

Examples of the epoxysilanes include γ-glycidoxypropyltrimethoxysilane, γ-glycidoxypropyldimethylethoxysilane, γ-glycidoxypropylmethylidiethoxysilane, β-(3,4-epoxycyclohexyl)ethylmethyldimethoxysilane, γ-glycidoxypropyltrimethoxysilane, β-(3,4-epoxycyclohexyl)ethyltrimethoxysilane, and the like.

Examples of the methacrylsilanes include 3-methacryloxypropylmethyldimethoxysilane, 3-methacryloxypropyltrimethoxysilane, 3-methacryloxypropylmethyldiethoxysilane, 3-methacryloxypropyltriethoxysilane, and the like.

Examples of the isocyanatosilanes include isocyanatopropyltriethoxysilane and isocyanatopropyltrimethoxysilane.

Examples of the ketiminesilanes include ketiminated propyltrimethoxysilane and ketiminated propyltriethoxysilane.

In the present invention, when the silane coupling agent is used, a content thereof is preferably from 0.1 to 10 parts by weight, and more preferably from 1 to 5 parts by weight, per 100 parts by weight of the polymer. When the content of the silane coupling agent is within this range, adhesive properties of the electrically debonding adhesive are better, and therefore is favorable.

The electrically debonding adhesive can include, if necessary, various additives, in a range that does not inhibit the object of the present invention, such as fillers other than the electrically conductive filler, plasticizers, antiaging agents, antioxidants, pigments (dyes), thixotropic agents, ultraviolet absorbers, fire retardants, solvents, surfactants (including leveling agents), dehydrating agents, rust inhibitors, adhesion promoters other than the silane coupling agents, and antistatic agents.

Examples of the fillers other than electrically conductive filler include silica, iron oxide, zinc oxide, aluminum oxide, titanium oxide, barium oxide, magnesium oxide, calcium carbonate, magnesium carbonate, zinc carbonate, pyrophyllite clay, kaolin clay, and calcined clay.

The plasticizer may be a known plasticizer used in ordinary resin compositions and rubber compositions. Specific examples include oils such as paraffin oils, process oils, aromatic oils, and the like; liquid rubbers such as liquid polyisoprene (LIR), liquid polybutadiene (LBR), liquid ethylene-propylene rubber (LEPM), and the like; tetrahydrophthalic acid, azelaic acid, benzoic acid, phthalic acid, trimellitic acid, pyromellitic acid, adipic acid, sebacic acid, fumaric acid, maleic acid, itaconic acid, citric acid, and derivatives thereof; dioctyl phthalate (DOP) and dibutyl phthalate (DBP); polybutene; dioctyl adipate, diisononyl adipate (DINA) and isodecyl succinate; diethylene glycol dibenzoate and pentaerythritol ester; butyl oleate and methyl acetylricinoleate; tricresyl phosphate and trioctyl phosphate; adipic acid-propylene glycol polyester, and adipic acid-butylene glycol polyester; and the like. These plasticizers may be used singly or as mixtures of two or more thereof Of these, from the perspective of oil bleeding properties and processability, using oils and polybutene is preferable.

Specific examples of the antiaging agents include hindered phenol compounds and aliphatic and aromatic hindered amine compounds, and the like.

Specific examples of the antioxidants include butylhydroxytoluene (BHT), butylhydroxyanisole (BHA), and the like.

Specific examples of the pigments include inorganic pigments such as titanium dioxide, zinc oxide, ultramarine blue, red iron oxide, lithopone, lead, cadmium, iron, cobalt, aluminum, hydrochlorides, sulfates, and the like; and organic pigments such as azo pigments, copper phthalocyanine pigments, and the like.

Specific examples of the thixotropic agents include bentonite, silicic acid anhydride, silicic acid derivatives, urea derivatives, and the like.

Specific examples of the ultraviolet absorbers include 2-hydroxybenzophenone, benzotriazole, salicylic acid ester, and the like ultraviolet absorbers.

Specific examples of the fire retardants include phosphorus-based fire retardants such as TCP and the like; halogenbased fire retardants such as chlorinated paraffins, perchloropentacyclodecane, and the like; antimony-based fire retardants such as antimony oxide and the like; aluminum hydroxide; and the like.

Specific examples of the solvents include hydrocarbon solvents such as hexane, toluene, and the like; halogenated hydrocarbon solvents such as tetrachloromethane and the like; ketone solvents such as acetone, methyl ethyl ketone, and the like; ether solvents such as diethyl ether, tetrahydrofuran, and the like; ester solvents such as ethyl acetate and the like; and the like.

Specific examples of the surfactants (leveling agents) include polybutyl acrylate, polydimethyl siloxane, modified silicone compounds, fluorine-based surfactants, and the like. Specific examples of the dehydrating agents include vinylsilane and the like.

Specific examples of the rust inhibitors include zinc phosphate, tannic acid derivatives, phosphoric acid esters, basic sulfonic acid salts, various types of rust-inhibiting pigments, and the like.

Specific examples of the adhesion promoters other than the silane coupling agents include titanium coupling agents, zirconium coupling agents, and the like.

Examples of the antistatic agents generally include quaternary ammonium salts, or hydrophilic compounds such as polyglycols, ethylene oxide derivatives, and the like.

The method for preparing the electrically debonding adhesive for use in the present invention is not particularly limited. For example, the composition may be prepared by using an apparatus such as a roll mill, kneader, pressure kneader, Banbury mixer, single-screw extruder, twin-screw extruder, or universal blender to mix together the ionic liquid, the polymer, the electrically conductive filler, and the other various additives.

Additionally, tire-wheel assemblies (Conventional examples 1 to 4) were fabricated using the same constructions as in Examples 1 to 4, respectively, except that the electrically conductive layer was not provided on the wheel contact surface of the tire and the electrically debonding adhesive was removed from between the tire and the wheel.

Furthermore, tire-wheel assemblies (Comparative examples 1 to 4) were fabricated using the same constructions as in Examples 1 to 4, respectively, except that the electrically conductive layer was not provided on the wheel contact surface of the tire and an adhesive formed from a thermoplastic resin was interposed between the tire and the wheel in place of the electrically debonding adhesive.

Each of the tire-wheel assemblies of the Conventional examples 1 to 4, the Comparative examples 1 to 4, and the Examples 1 to 4 were tested according to the following methods and evaluated for rim shifting resistance and tire replacement workability.

Rim Shifting Resistance

Each tire-wheel assembly was mounted on a test vehicle and brakes were applied suddenly while traveling at a speed of 50 km/h. Such sudden braking was repeated 20 times, following which relative shifting of the tire and the wheel in the circumferential direction was visually examined. Evaluation results were recorded according to the following scale. ○: No rim shifting, Δ: Slight rim shifting, ×: Severe rim shifting.

Tire Replacement Workability

Time required to remove the tire from the wheel for each tire-wheel assembly was measured. However, electricity was applied to the electrically debonding adhesive in advance for the Examples 1 to 4. Evaluation results were expressed as an index with time results of the Conventional examples 1 to 4 being set to 100. Smaller index values indicate excellent tire replacement workability.

TABLE 1*

| | Conv. Ex. 1 | Comp. Ex. 1 | Ex. 1 | Conv. Ex. 2 | Comp. Ex. 2 | Ex. 2 | Conv. Ex. 3 | Comp. Ex. 3 | Ex. 3 | Conv. Ex. 4 | Comp. Ex. 4 | Ex. 4 |
|---|---|---|---|---|---|---|---|---|---|---|---|---|
| Structure | (F. 1) | (F. 1) | F. 1 | (F. 3) | (F. 3) | F. 3 | (F. 5) | (F. 5) | F. 5 | (F. 8) | (F. 8) | F. 8 |
| Rim shifting resistance | × | ○ | ○ | × | ○ | ○ | × | ○ | ○ | × | ○ | ○ |
| Tire replacement workability | 100 | — | 100 | 100 | — | 100 | 100 | — | 100 | 100 | 150 | 100 |

*As used in Table 1, "Conv." is an abbreviation for "Conventional", "Comp." is an abbreviation for "Comparative", "Ex." is an abbreviation for "Example", and "F." is an abbreviation for "Figure".

EXAMPLES

Tire-wheel assemblies of Examples 1 to 4 were fabricated including a wheel constructed from an electrically conductive material and a tire assembled on an outer peripheral side of the wheel, wherein an electrically conductive layer was formed on at least a part of a wheel contact surface of the tire, and an electrically debonding adhesive including an ionic liquid was interposed between the electrically conductive layer of the tire and the wheel. Specifically, a tire-wheel assembly (Example 1) shown in FIG. 1, a tire-wheel assembly (Example 2) shown in FIG. 3, a tire-wheel assembly (Example 3) shown in FIG. 5, and a tire-wheel assembly (Example 4) shown in FIG. 8 were fabricated. Note that for Example 4, a size 225/40R18 tire was used and air pressure was adjusted to 230 kPa. Tire size for Examples 1 to 3 was the same as in Example 4.

As is evident from Table 1, when compared to the Conventional examples 1 to 4, the tire-wheel assemblies of the Examples 1 to 4 were able to display improved rim shifting resistance without negatively affecting tire replacement workability.

On the other hand, while there was improved rim shifting resistance in the tire-wheel assemblies of Comparative examples 1 to 4, the tire replacement workability was substantially worsened. Particularly in Comparative examples 1 to 3, the tire could not be removed from the wheel.

What is claimed is:

1. A tire-wheel assembly comprising a wheel constructed from an electrically conductive material and a tire assembled on an outer peripheral side of the wheel, wherein
   an electrically conductive layer is formed on at least a part of a wheel contact surface of the tire, the electrically conductive layer being disposed intermittently at intervals along a circumferential direction of the wheel contact surface of the tire, a releasing layer is disposed in regions of the wheel contact surface of the tire where the electrically conductive layer does not exist, and an electrically debonding adhesive comprising an ionic liquid is interposed between the wheel contact surface of the tire including the electrically conductive layer and the releasing layer, and the wheel.

2. The tire-wheel assembly according to claim 1, wherein an amount of the ionic liquid contained in the electrically debonding adhesive is from 0.1 to 30 weight %.

3. The tire-wheel assembly according to claim 1, wherein the electrically debonding adhesive is disposed in a range from 30% to 100% of a length, measured along a meridian cross-section, of the wheel contact surface of the tire.

4. The tire-wheel assembly according to claim 1, wherein the electrically conductive layer is an electrically conductive sheet material.

5. The tire-wheel assembly according to claim 1, wherein the electrically conductive layer is an electrically conductive film.

6. A disassembly method for the tire-wheel assembly of claim 1, wherein the tire is removed from the wheel after voltage is applied between the wheel and the electrically conductive layer of the tire and electricity is passed through the electrically debonding adhesive.

* * * * *